July 18, 1950 M. D. McCAULEY 2,515,415
LAWN MOWER
Filed Feb. 26, 1949 2 Sheets-Sheet 1
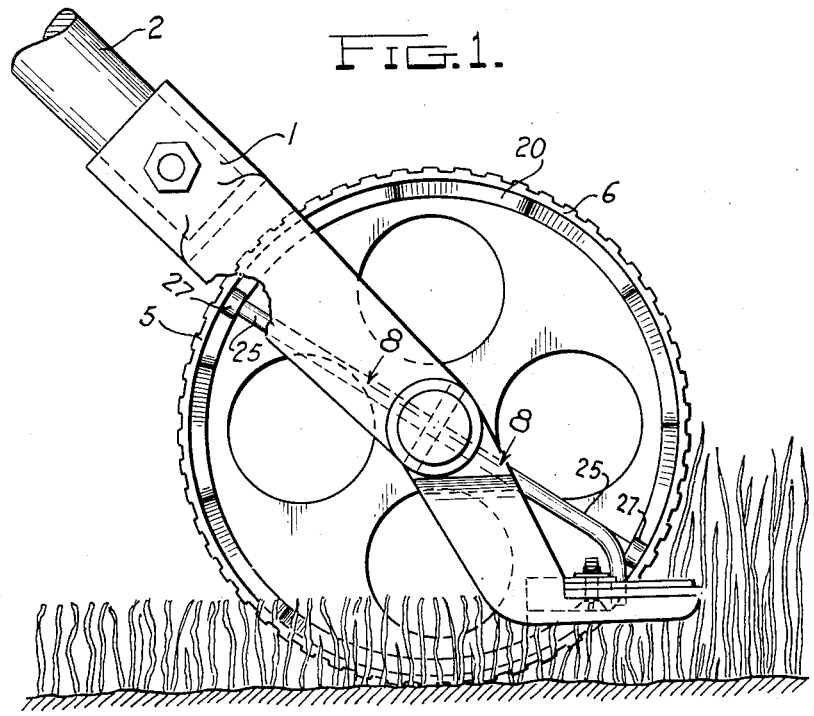
FIG. 1.
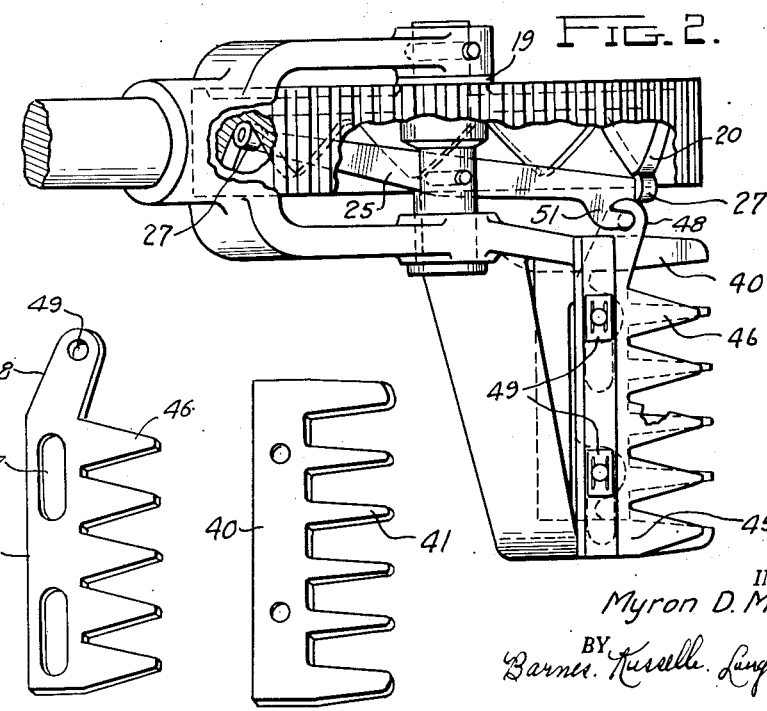
FIG. 2.
FIG. 3. FIG. 4.
INVENTOR.
Myron D. McCauley
BY
Barnes, Kisselle, Laughlin & Raisch
ATTORNEYS July 18, 1950 M. D. McCAULEY 2,515,415
LAWN MOWER
Filed Feb. 26, 1949 2 Sheets-Sheet 2
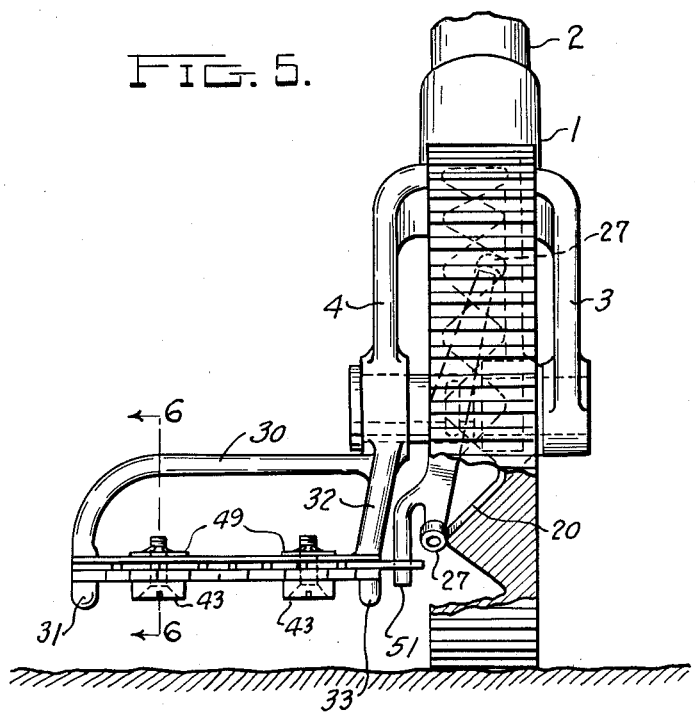
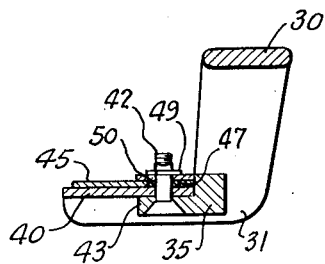
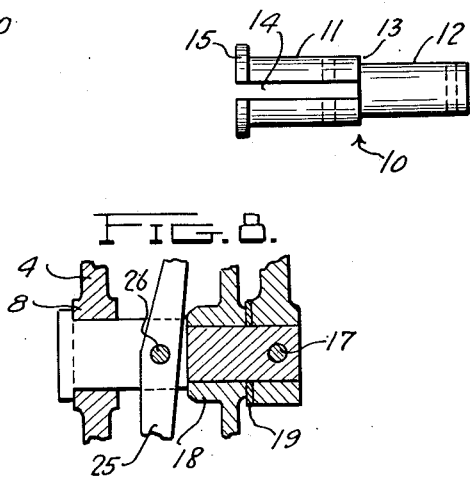
INVENTOR.
Myron D. McCauley
BY
ATTORNEYS Patented July 18, 1950

2,515,415

UNITED STATES PATENT OFFICE 2,515,415

LAWN MOWER

Myron D. McCauley, Huntington Woods, Mich.

Application February 26, 1949, Serial No. 78,596

5 Claims. (Cl. 56—264)

This invention relates to a lawn mower and especially to a lawn mower operable in places where the cutting of grass is in the nature of a trimming operation.

The objects of the invention include the provision of a mower or trimmer of novel construction wherein the cutting mechanism is fully exposed at one end so that it may cut grass along walkways or driveways or adjacent the wall of a house or building or the like, and other places, especially at any edge portion of an area of grass. The invention aims especially to provide an improved mower of the reciprocating cutter bar type, which is a rugged, well balanced construction embodying a minimum number of parts and parts which are not liable to be broken, to the end that the device may be produced at a low cost while possessing high efficiency and long life.

A mower constructed in accordance with the invention is shown in the accompanying drawings:

Fig. 1 is a side elevational view of the mower with parts broken away and illustrating the mower in use.

Fig. 2 is a top plan view with some parts broken away and some parts in section illustrating the general structure.

Fig. 3 is a view illustrating the reciprocable cutter bar.

Fig. 4 is a view of the comb.

Fig. 5 is a front view of the mower with some parts cut away and some in section illustrating the mower in use.

Fig. 6 is a sectional view taken substantially on line 6—6 of Fig. 5 showing the comb and cutter bar arrangement.

Fig. 7 is a detailed view illustrating the main bearing pin.

Fig. 8 is a sectional view taken on line 8—8 of Fig. 1 showing the main bearing pin, the mounting and the actuator for the cutter bar.

The structure of the mower embodies a frame or body member generally illustrated at 1 and arranged to receive a suitable handle 2. This body member, as shown in Fig. 5, is of forked construction having spaced arms 3 and 4 for receiving therebetween the single main wheel 6 having a ground engaging portion or tire 5. A bearing pin, as illustrated in Fig. 7, is mounted in receiving portions 7 and 8 of the arms 3 and 4. This bearing pin is generally illustrated at 10 and it has a section of large diameter 11, a section of small diameter 12 separated by a shoulder 13. The pin has a slot 14 in its larger section with a flange 15 at one end. The pin is placed in the portions 7 and 8 of the arms 3 and 4 and held in position by a pin 17 (Fig. 8) with the hub 18 of the wheel journalled on the small portion 12 of the main bearing pin. The hub is positioned between the shoulder 13 and a thrust bearing 19.

The wheel is provided, within its ground engaging tire or periphery, with a series of cams 20. These extend entirely around the periphery of the wheel, are uniform in nature and present open cam surfaces. There is an actuator in the form of a lever or walking beam. This actuator is shown at 25 and it lies in the slot 14 and is swiveled on a pin 26. Each end of the actuator is provided with a roller 27 for engagement with the cam formation. The arrangement is such that when one end is on the high point of one cam formation, the other end is at the root of the opposite cam formation or, in other words, at the bottom of the groove between two cam elements. This is shown in Fig. 2. The rollers 27 may be merely slipped onto the ends of the lever 25, which are rounded for the purpose, and the rollers are held thereon because they lie just within the rim 5 of the wheel. This will be appreciated by reference to Fig. 1.

The body has a supporting bracket structure on one side, this bracket structure conveniently being integral with the body and, as shown, it comprises an outwardly extending bracket member 30 which terminates in an outer end member 31 and it has a downwardly extending bracket member 32 terminating in an inner end member 33. A support 35 extends across substantially from the outer and inner end members 31 and 33, this being shown in Fig. 6. This support is shaped, as shown in Fig. 6, for receiving a comb 40, as shown in Fig. 4, with teeth 41 and with apertures for receiving clamping bolts 42. The cross member 35 has forwardly extending lugs 43, upon which the comb rests and through which the securing bolts extend. A cutter bar 45 is shown in Fig. 3. It has cutter teeth 46, elongated slots 47, and an extending arm 48 with an aperture 49. This cutter bar overlies the comb, as shown in Fig. 6, and the bolts pass through the elongated apertures. Preferably, bearing washers 47 are placed around the bolts 42, so as to lie in the elongated apertures 47. A top plate 50 is positioned over the body portion of the cutter bar and the entire assembly of the comb, cutter bar, and top plate is held by the bolts 42 with suitable tightness for the reciprocation and operation of the cutter bar. Preferably spring nuts 44 are used with the bolts for holding the cutter bar and comb in yieldable engagement with each other. The actuator lever 25 is formed with a projecting finger 51, which is positioned in the aperture 49 of the cutter bar.

In the operation of the device, the wheel 6 is caused to rest upon the ground or other supporting surface which may, in some instances, be a walk or driveway, with the handle and the body held in a position as substantially illustrated in Fig. 1. Needless to say, the body is so shaped that when the handle is in a normal position, the cutter bar and comb are in a proper cutting position. As the mower is moved along the supporting surface, the wheel 6 rotates, the same turning on the main bearing pin and this causes an oscillation of the actuator lever 25. The connection with the cutter bar causes reciprocation of the cutter bar between the comb and the plate 50, and in this reciprocation, the blades 46 of the cutter bar shift back and forth relative to the teeth of the comb and thereby sever the blades of grass which enter the spaces between the teeth of the comb.

There is a positive movement of the cutter bar in each direction of its reciprocatory movement. This is because the actuator lever 25 is positively moved in its both directions of its oscillation in the cam formation. Thus, there is a complete elimination of springs and other parts which may wear out or become defective. The actuating lever places and quite constantly maintains an axial thrust on the wheel which is to the right as Fig. 8 is viewed and, accordingly, a single thrust bearing, such as the one shown at 19, is believed to suffice. It will be noted that the body and the wheel and the oscillating actuator lever comprise the main operating parts and that the structure of the same is such that only a few parts are embodied and these are of the type possessing long life and efficient operation. The cutter bar and comb may be easily removed for replacement or sharpening by the simple expedient of removing the bolts 42. The extent of the reciprocation of the cutter bar is, of course, adequate to traverse those of the comb and the cams are in such number as to provide a rate of reciprocation of the cutter bar with reference to the circumference of the wheel to efficiently sever the blades of grass which enter between the teeth of the comb.

I claim:

1. A lawn mower comprising, a body member, a ground engaging wheel journalled in the body member, cutting means including a reciprocable cutter bar supported by the body member and projecting laterally from the wheel, a cam formation embodying a plurality of cam elements on the wheel, an operating lever pivotally mounted substantially on the axis of the wheel with its pivot substantially at right angles to and intersecting the axis of the wheel having its opposite ends in engagement with the cam formation, whereby the operating lever is caused to rock as the wheel rotates, and means connecting the operating member with the cutter bar.

2. A lawn mower comprising, a body member, a ground engaging wheel journalled in the body member, cutting means including a reciprocable cutter bar supported by the body member and projecting laterally from the wheel, said wheel having a laterally projecting ground engaging rim, a cam formation on the wheel inside the rim embodying a plurality of circumferentially arranged cam elements with exposed cam surfaces facing in the direction of the cutting means, an operating lever pivotally mounted substantially on the axis of the wheel with its pivot substantially at right angles to the axis of the wheel, opposite ends of the lever being disposed within the laterally projecting rim of the wheel and having rollers thereon held on the operating lever by the rim of the wheel, said rollers being in engagement with the cam formation so that the operating lever is caused to rock as the wheel rotates and means connecting the operating lever with the cutter bar.

3. A lawn mower comprising, a body arranged to receive a handle and having spaced fork members, a ground engaging wheel in between the fork members, a bearing pin mounted in the fork members and upon which the wheel is mounted, said bearing pin having a slot therein, an actuator lever positioned in the slot, a pivot for the actuator lever mounted in the bearing pin substantially at right angles to the axis of the bearing pin, the wheel having a circumferentially arranged cam formation embodying a plurality of cam elements, the opposite ends of the operating lever being in engagement with the cam formation, whereby the operating lever is caused to rock as the wheel rotates, cutting means including a reciprocable cutter bar carried by the body member and projecting laterally from the wheel, and means connecting the operating lever with the cutter bar.

4. A lawn mower comprising, a body arranged to receive a handle and having spaced fork members, a ground engaging wheel in between the fork members, a bearing pin mounted in the fork members and upon which the wheel is mounted, said bearing pin having a slot therein, an actuator lever positioned in the slot, a pivot for the actuator lever mounted in the bearing pin substantially at right angles to the axis of the bearing pin, the wheel having a circumferentially arranged cam formation embodying a plurality of cam elements, the opposite ends of the operating lever being in engagement with the cam formation, whereby the operating lever is caused to rock as the wheel rotates, cutting means including a reciprocable cutter bar carried by the body member and projecting laterally from the wheel, said operating lever having a projecting finger and the cutter bar having a projection with an aperture for receiving the finger, whereby to reciprocate the cutter bar as the lever rocks.

5. A lawn mower comprising a body arranged to receive a handle, said body having spaced fork members, one of the fork members having bracket means extending laterally therefrom, cutting means including a comb and a reciprocable cutter bar supported by said bracket means, a bearing pin mounted in the fork members, a ground engaging wheel journalled on the bearing pin, means connecting the bearing pin to the body so that it is non-rotatable, the bearing pin having a slot therein, an operating lever positioned in the slot and having a pivot substantially at right angles to the axis of the bearing pin, a cam formation on the wheel embodying a plurality of laterally disposed cam elements, opposite ends of the operating lever being in engagement with the cam formation, whereby the operating member is oscillated as the wheel rotates, and a connection between the operating lever and the cutter bar.

MYRON D. McCAULEY.

REFERENCES CITED

The following references are of record in the file of this patent:

UNITED STATES PATENTS

| Number | Name | Date |
|---|---|---|
| 178,034 | Thomson | May 30, 1876 |
| 1,410,362 | Blake | Mar. 21, 1922 |
| 2,023,029 | Palmer | Dec. 3, 1935 |